Dec. 18, 1945.    J. R. PRALL    2,391,344
CRYSTAL INSPECTION DEVICE
Filed Aug. 18, 1943

INVENTOR.
JAMES R. PRALL
BY
ATTORNEY

Patented Dec. 18, 1945

2,391,344

UNITED STATES PATENT OFFICE 2,391,344

CRYSTAL INSPECTION DEVICE

James R. Prall, Newark, N. J., assignor to Federal Telephone and Radio Corporation, New York, N. Y., a corporation of Delaware Application August 18, 1943, Serial No. 499,043

6 Claims. (Cl. 88—14)

This invention relates to the art of optical testing of piezo electric crystal elements by inspection thereof for the detection of flaws therein and consists of an improved device adapted to insure uniform and efficient testing conditions for quantity production and to otherwise facilitate the sorting operation.

In the commonly employed method of producing oscillating and resonant control elements from the natural crystal formation, the crystal elements are uniformly cut to dimensions proportioned to obtain the desired vibration frequency value suited to their intended use. Among the factors important in obtaining the desired product is that the crystals shall be free of flaws of a character influencing their proper operation such as chips, cracks, needles, pits or other irregularities commonly present in the crystal structure. This accordingly prescribes that the crystals shall be carefully inspected for such flaws for economical discard of defective elements.

The device of the present invention is designed to facilitate quantity inspection or testing of the crystal blanks, commonly in the form of rectangular bodies, under particularly efficient test conditions and conducive to greater uniformity in selection. To this end it consists of an improved testing apparatus having a light box or testing lamp structure and designed for the supporting and feeding of a quantity or stack of crystal blanks or elements successively to a viewing or test position. They are there subjected to the passage of light rays therethrough unidirectionally and edgewise of the blank. In its inspection test position, the upper flat surface or face of the blank is exposed for viewing and, in accordance with the invention, special provision is made for projecting a beam of high intensity light through the blank parallel to the viewing face thereof. As a result, if there are no flaws present the light rays will enter one edge of the blank and will be transmitted outwardly through the opposite edge showing a uniform surface to the observer. If however flaws of the character referred to are present the irregularities will intercept the light rays and by their refraction transmit them to the exposed or viewing surface to show as bright points or spots of heightened light intensity readily visible to the operator.

The described and other features and advantages of the present improvements will be more fully understood by reference to the accompanying drawing wherein like reference characters are applied to the corresponding parts in the several views.

Figure 1:
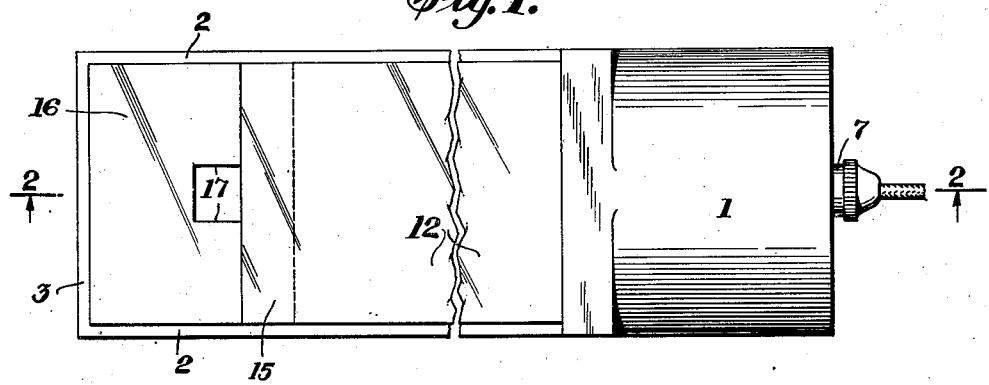
Fig. 1 is a plan view of the improved inspection device of my invention.
Figure 2:
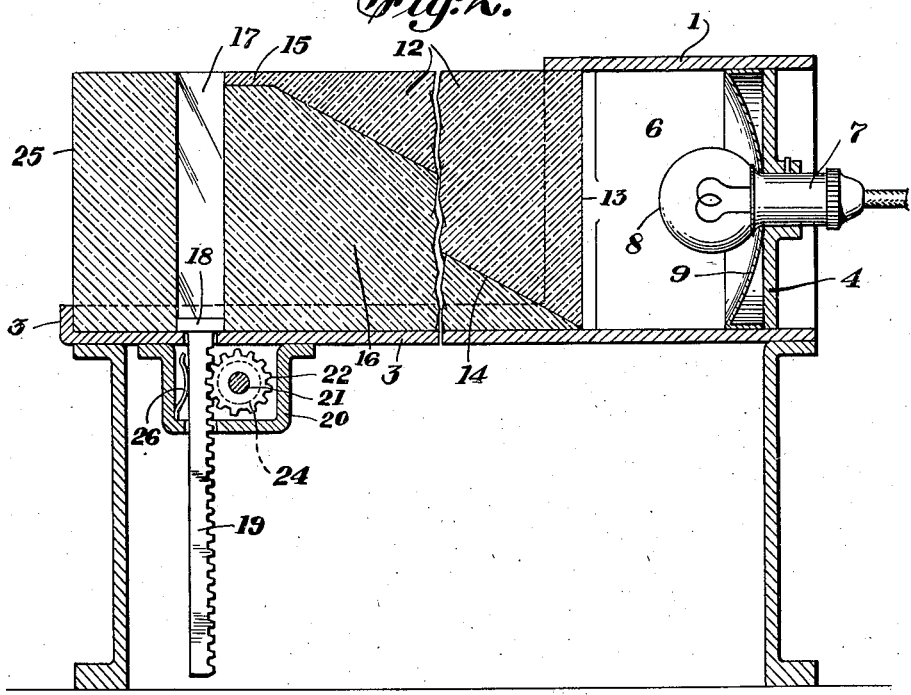
Fig. 2 is a central, longitudinal, vertical section thereof on line 2—2 of Fig. 1.
Figure 3:
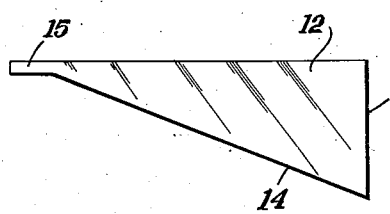
Fig. 3 is a view in side elevation of the light transmission block.

The present improvements in the preferred form are illustrated herein as comprising a light tight lamp box structure having therein special provision for the projection of a narrow beam of high intensity light to pass edgewise into and through the uppermost crystal of a stack of crystal blanks which are successively advanced to viewing position by a suitable supporting and feeding arrangement.

The lamp housing, as shown, is of generally cylindrical form having a cylindrical wall 1, having base extension 3, and the slidably fitted end wall 4. Within its lamp compartment 6 there is provided the lamp socket 7, lamp 8, and reflector 9 for directing the light rays forwardly.

Positioned forwardly of the lamp compartment and forming the forward partitioning wall therefor, there is provided a light transmission block 12 of a form and material to project a narrow light beam of high intensity from the upper forward edge portion thereof, the beam having a depth substantially corresponding to the edge surface dimensions of the crystal blank to be inspected. The form of the block as shown provides a transversely extending vertical rear surface 13, an upwardly and forwardly inclined front surface 14 having a union with an upper wall forward extension 15 of rectangular section and of a depth or thickness corresponding to that of the crystal blank rear edge surface.

This light transmission block is made of a substance having a very large index of light refraction such as Lucite, Plexiglas, Crystalithe or like material. The rearward surface 13, forward inclined surface 14 and the upper surface of the block 12 are highly polished for the non-transmission of angularly directed rays so that the major portion of light rays entering the block are by reflection concentrated to pass forwardly through the extension portion 15. In cooperative relation thereto, forward blocks and guiding members 16 and 25 are provided and formed to establish a vertical guideway or slot 17 of a size and cross-sectional form to receive and guide the upward passage of the blanks therethrough. As shown the guideway is formed by a vertical slot in the rear wall of the block 25 in conjunction with the front face of the block 16. The member 16 at its rearward portion is formed to be complemental to the forward end portion of the block member 12, as shown. The forward block members 16 and 25 may likewise be formed of light transmitting material such as Lucite so as to avoid conflicting reflection of light rays. The rear wall of the guide slot is in vertical alignment with the forward edge surface of the extension 15 of the block 12 whereby as shown the forward edge of extension 15 forms a portion of the rear wall of the slot.

For the inspection of the blanks, means are provided for progressively elevating the blanks to bring them into the testing position with their upper surfaces level with the top wall surface of the block member. This, as shown, consists of an elevator member 18 upon which a stack of crystal blanks is placed. The member 18 operates within the guideway slot 17 and is provided with a depending vertical rack 19 operating in a slide bearing of a bracket 20 secured to the under side of the member 3, and formed with bearings for a transverse shaft 21 having a pinion 22 engaging the rack and provided on its outer end with a hand wheel 24 to operate the rack. The bearing arrangement of the rack includes a flat spring 26 engaging the rack to produce supporting friction thereon sufficient to support the stack of blanks while permitting movement of the elevating means by slipping of its frictional engagement. Thus the blanks may be conveniently raised by manipulation of the wheel 24 and when fully elevated the lifting member may be depressed by manual downward pressure. A renewed stack of blanks, or a revised stack, may be readily placed within the guideway groove of forward block 25 upon removal thereof.

In the inspection treating operation, as will be readily understood, the crystal blanks are advanced upwardly, in succession, to position their upper flat faces flush with the top surface of the block members for observation with the light rays passing horizontally therethrough from the extension and edgewise of the blank.

Having described my invention, I claim:

1. Apparatus for test inspection of piezo-electric crystal blanks comprising a lamp housing structure, a lamp therein, means for directing light rays to pass forwardly therefrom in a concentrated beam including a light transmission block of a material having a high index of refraction, said block having a rearward polished wall surface perpendicular to the beam emitted by said light source, said block having an upwardly and forwardly inclined polished forward wall surface and a polished top wall surface having a forward extension therefrom forming the upper surface of a reduced portion having its lower surface joined to the inclined wall at the outer end thereof and being of a thickness corresponding substantially to the thickness of the blanks to be tested, a supporting structure including a forward block member and an auxiliary block member having a recess to provide a vertical guideway passage to conduct the blanks into the beam of light from the transmission block forward extension, said forward block being arranged to support said light transmission block and forming with the forward extension of the latter one side wall of said passage, and means to advance a stack of crystal blanks through the passage.

2. Apparatus for test inspection of piezo-electric crystal blanks for flaws including a housing, a light source therein means operative to advance a stack of blanks vertically and a light transmission block having a high index of refraction for transmitting light rays in a concentrated beam, placed so that a polished end of said block receives light rays from said source and the other end is in direct contact with the edge surface of the uppermost test blank, the latter end being tapered to a thickness commensurate with the edge thickness of said blank, whereby said concentrated beam issuing from said tapered end passes edgewise through said uppermost blank to render flaws visible by refraction of light rays therefrom.

3. Apparatus for test inspection of piezo-electric crystal blanks for flaws including a housing, a light source therein, means for transmitting light rays from said source in a concentrated beam, a supporting structure in the form of a separable block having a vertical guide slot to receive a stack of crystal blanks and of transverse dimensions such as to maintain the blanks in spaced relation and means for advancing said stack to move individual blanks thereof successively into the path of said beam when in uppermost position and in edgewise relation thereto, whereby flaws are made visible by refraction of light rays therefrom.

4. Apparatus for test inspection of piezo-electric crystals comprising a housing, a lamp therein, a supporting structure in the form of a block having a vertical opening therethrough to receive a stack of crystal blanks and of transverse dimensions such that the walls of the opening maintain the blanks in stacked relation, means for directing the light rays from the lamp to pass forwardly in a concentrated beam along the upper surface of said supporting structure and means to advance said stack of crystal blanks relative to the supporting structure to move individual blanks thereof successively into the path of said concentrated beam in edgewise relation thereto whereby flaws become visible at said opening by refraction of light rays from said flaws.

5. Apparatus as set forth in claim 4 in which said advancing means comprises a backing support for said stack and an elevating mechanism associated therewith.

6. Apparatus for test inspection of piezo-electric crystals comprising a supporting structure in the form of a block provided with a vertical opening therein to receive a stack of crystal blanks and of transverse dimensions such that the walls of the opening maintain the blanks in stacked relation, elevating means for advancing said stack of crystal blanks upwardly through the opening consisting of an elevator support provided with a table and a rack, and a pinion suitably journaled to engage the rack, a housing, a lamp within the housing and means to concentrate the beam of light from said lamp and to pass said beam edgewise of a blank in uppermost position for testing thereof by the light refraction of crystal flaws.

JAMES R. PRALL.